United States Patent
Komuro et al.

(10) Patent No.: US 12,431,269 B2
(45) Date of Patent: Sep. 30, 2025

(54) SOFT MAGNETIC STEEL SHEET, METHOD FOR MANUFACTURING THE SOFT MAGNETIC STEEL SHEET, AND CORE AND DYNAMO-ELECTRIC MACHINE IN WHICH THE SOFT MAGNETIC STEEL SHEET IS USED

(71) Applicant: Hitachi, Ltd., Tokyo (JP)

(72) Inventors: Matahiro Komuro, Tokyo (JP); Shohei Terada, Tokyo (JP); Yusuke Asari, Tokyo (JP)

(73) Assignee: HITACHI, LTD., Tokyo (JP)

( * ) Notice: Subject to any disclaimer, the term of this patent is extended or adjusted under 35 U.S.C. 154(b) by 534 days.

(21) Appl. No.: 17/779,158

(22) PCT Filed: Aug. 28, 2020

(86) PCT No.: PCT/JP2020/032669
§ 371 (c)(1),
(2) Date: May 24, 2022

(87) PCT Pub. No.: WO2021/131162
PCT Pub. Date: Jul. 1, 2021

(65) Prior Publication Data
US 2022/0328225 A1    Oct. 13, 2022

(30) Foreign Application Priority Data

Dec. 25, 2019 (JP) ................................ 2019-234302

(51) Int. Cl.
*H01F 1/16* (2006.01)
*C23C 8/26* (2006.01)
(Continued)

(52) U.S. Cl.
CPC .................. *H01F 1/16* (2013.01); *C23C 8/26* (2013.01); *H01F 1/147* (2013.01); *H02K 1/02* (2013.01)

(58) Field of Classification Search
CPC ... H01F 1/16; H01F 1/147; C23C 8/26; C23C 8/80; H02K 1/02; H02K 15/024;
(Continued)

(56) References Cited

FOREIGN PATENT DOCUMENTS

| JP | 61-143557 A | 7/1986 |
|---|---|---|
| JP | 63-007332 A | 1/1988 |

(Continued)

OTHER PUBLICATIONS

International Search Report of PCT/JP2020/032669 dated Nov. 17, 2020.

*Primary Examiner* — Sally A Merkling
*Assistant Examiner* — Danny N Kang
(74) *Attorney, Agent, or Firm* — Mattingly & Malur, PC (57) ABSTRACT

The present invention aims at providing an iron-nitrogen-based soft magnetic steel sheet having a saturation magnetic flux density higher than that of pure iron, a method for manufacturing the soft magnetic steel sheet, and a core and a dynamo-electric machine in which the soft magnetic steel sheet is used. The soft magnetic steel sheet according to the present invention includes C, N, and the balance of Fe and inevitable impurities and is comprised of an α phase, an α' phase, an α" phase, and a γ phase. The α phase serves as a main phase, a volume ratio of the α" phase is 10% or more, and a volume ratio of the γ phase is 5% or less. The core according to the present invention includes a laminated body of the soft magnetic steel sheets.

7 Claims, 3 Drawing Sheets

(51) Int. Cl.
*H01F 1/147* (2006.01)
*H02K 1/02* (2006.01)

(58) Field of Classification Search
CPC ........... B32B 15/011; C21D 1/04; C21D 1/26; C21D 9/46; C21D 1/76; C21D 6/04; C21D 8/1255; C22C 38/00; C22C 38/001; C22C 38/02
See application file for complete search history.

(56) References Cited

FOREIGN PATENT DOCUMENTS

| | | | | |
|---|---|---|---|---|
| JP | 03-244108 A | 10/1991 | | |
| JP | H03244108 A | * 10/1991 | ............... | H01F 1/20 |
| JP | 04-268027 A | 9/1992 | | |
| JP | 07-118703 A | 5/1995 | | |
| JP | 2001-176715 A | 6/2001 | | |
| JP | 2005-226116 A | 8/2005 | | |
| JP | 2015-507354 A | 3/2015 | | |
| WO | 2013/090895 A1 | 6/2013 | | |

* cited by examiner

SOFT MAGNETIC STEEL SHEET, METHOD FOR MANUFACTURING THE SOFT MAGNETIC STEEL SHEET, AND CORE AND DYNAMO-ELECTRIC MACHINE IN WHICH THE SOFT MAGNETIC STEEL SHEET IS USED

TECHNICAL FIELD

The present invention relates to a technology for a magnetic material, and particularly relates to an iron-nitrogen-based soft magnetic steel sheet having a saturation magnetic flux density higher than that of pure iron, a method for manufacturing the soft magnetic steel sheet, and a core and a dynamo-electric machine in which the soft magnetic steel sheet is used.

BACKGROUND ART

As a bulk alloy exhibiting Bs higher than a saturation magnetic flux density "Bs=2.14 T" of pure iron at 20° C. in a soft magnetic material, an iron-cobalt-based alloy (e.g., Fe-49% Co-2% V, Bs=2.4 T) is known. However, Co used in the Fe—Co-based alloy is extremely higher in price than Fe used therein.

Meanwhile, as a soft magnetic material lower in price than the Fe—Co-based alloy and exhibiting Bs higher than Bs of pure iron, attention has been focused on a $Fe_{16}N_2$ phase as a metastable compound phase in recent years, and various study and development has been performed. For example, in Patent Literature 1 (Japanese Unexamined Patent Application Publication No. 2001-176715), a high saturation magnetization Fe—N-based magnetic body in which a mixed phase of an a-Fe phase and a $Fe_{16}N_2$ phase serves as a main phase and a rate of production of the $Fe_{16}N_2$ phase in the mixed phase is at least 10% and at most 90% is reported.

In Patent Literature 1, as a method for manufacturing the Fe—N-based magnetic body, a manufacturing method including a reducing step of reducing iron oxide powder or metallic iron powder (having a grain diameter of 10 to 50 nm) having a surface covered with a thin oxide film in a hydrogen gas stream and a nitriding step of nitriding iron powder obtained in the reducing step in an ammonia gas stream or in a mixed gas stream including an ammonia gas is shown by way of example.

In Patent Literature 2 (Japanese Translation of PCT Application No. 2015-507354), a method for manufacturing regular martensite iron nitride ($\alpha''$-$Fe_{16}N_2$) powder is reported. The manufacturing method includes steps of: (a) producing iron alloy powder (having a grain diameter of 10 to 20 μm) having an intended composition and an intended uniformity; (b) bringing the iron alloy powder into contact with a nitrogen source in a fluid bed reactor to nitride the iron alloy powder and produce iron nitride powder; (c) causing the iron nitride powder to transition to an irregular martensite phase; (d) annealing the irregular martensite phase to change the irregular martensite phase to a regular martensite phase; and (e) separating the regular martensite phase from the iron nitride powder to obtain the regular martensite iron nitride powder.

CITATION LIST

Patent Literatures

Patent Literature 1: Japanese Unexamined Patent Application Publication No. 2001-176715, and Patent Literature 2: Japanese Translation of PCT Application No. 2015-507354.

SUMMARY OF INVENTION

Technical Problem

However, when it is assumed that a soft magnetic material is used for an electromagnetic steel sheet, it cannot be said that powder materials and manufacturing methods therefor as disclosed in Patent Literatures 1 and 2 are appropriate for use to manufacture a thin sheet material such as an electromagnetic steel sheet. In other words, a thin sheet material exhibiting a desirable magnetic property, such as an electromagnetic steel sheet, and a method for manufacturing such a thin sheet material cannot be known from Patent Literatures 1 and 2.

It is therefore an object of the present invention to provide an iron-nitrogen-based soft magnetic steel sheet having Bs higher than that of pure iron, a method for manufacturing the soft magnetic steel sheet, a core and a dynamo-electric machine in which the soft magnetic steel sheet is used.

Solution to Problem (I) An aspect of the present invention provides a soft magnetic steel sheet including: carbon, nitrogen, and the balance of Fe and inevitable impurities, wherein the soft magnetic steel sheet is comprised of an α phase, an α' phase, an α" phase, and a γ phase, the α phase serves as a main phase, a volume ratio of the α" phase is 10% or more, and a volume ratio of the γ phase is 5% or less.

The present invention can add, to the above soft magnet steel sheet (I) according to the present invention, the following improvements and modifications.

(i) A total concentration of the carbon and the nitrogen is at least 0.01 at % and at most 10 at %, and a concentration of the nitrogen is higher than a concentration of the carbon.

(ii) The α" phase is a crystal phase in which a ratio "c/a" of a c-axis length to an a-axis length as a lattice constant is different from that of $Fe_{16}N_2$ having a stoichiometric composition.

(iii) The concentration of the carbon is 1.2 at % or less, and the concentration of the nitrogen is 9 at % or less.

(iv) A saturation magnetic flux density Bs of the soft magnetic steel sheet is over 2.14 T.

(v) A thickness of the soft magnetic steel sheet is at least 0.03 mm and at most 1 mm.

(II) Another aspect of the present invention provides a method for manufacturing the above soft magnetic steel sheet, the method including: a nitriding heat treatment step of performing a heat treatment of introducing and diffusing an N atom into a starting material made of a low-carbon steel sheet having a carbon concentration of 0.25 mass % or less or an electromagnetic pure iron sheet having a carbon concentration of 0.03 mass % or less in a temperature range of at least 592° C. and less than 911° C. and in a predetermined ammonia gas atmosphere environment and then cooling the starting material to a predetermined temperature by using a predetermined cooling method; and an iron nitride phase generating step of performing a tempering heat treatment on the starting material after being subjected to the nitriding treatment step in a temperature range of at least 100° C. and at most 210° C. to generate iron nitride phases which are the α' phase and the α" phase.

The present invention can add, to the above method for manufacturing the soft magnet steel sheet (II) according to the present invention, the following improvements and modifications.

(vi) The predetermined temperature in the nitriding treatment step is a tempering temperature of at least 100° C. and at most 210° C.

(vii) The predetermined temperature in the nitriding treatment step is less than 100° C., and the predetermined cooling method is quenching.

(viii) Between the nitriding treatment step and the iron nitride phase generating step, a sub-zero treatment of cooling the starting material after being subjected to the nitriding treatment step to 0° or less is further performed.

(ix) When the nitriding heat treatment and/or the tempering heat treatment is performed, a stress field and/or an electromagnetic field is applied to the sheet to be subjected to the heat treatment.

(III) Still another aspect of the present invention provides a method for manufacturing the above soft magnetic steel sheet, the method including: a nitriding heat treatment step of performing a heat treatment of introducing and diffusing an N atom into a starting material made of a low-carbon steel sheet having a carbon concentration of 0.25 mass % or less or an electromagnetic pure iron sheet having a carbon concentration of 0.03 mass % or less in a temperature range of at least 500° C. and less than 592° C. and in a predetermined ammonia gas atmosphere environment and then quench-cooling the starting material to a temperature less than 100° C.; and an iron nitride phase generating step of performing a tempering heat treatment on the starting material after being subjected to the nitriding treatment step in a temperature range of at least 100° C. and at most 210° C. to generate iron nitride phases which are the $\alpha'$ phase and the $\alpha''$ phase.

The present invention can add, to the above method for manufacturing the soft magnet steel sheet (III) according to the present invention, the following improvements and modifications.

(x) Between the nitriding treatment step and the iron nitride phase generating step, a sub-zero treatment of cooling the starting material after being subjected to the nitriding treatment step to 0° or less is further performed.

(xi) When the nitriding heat treatment and/or the tempering heat treatment is performed, a stress field and/or an electromagnetic field is applied to the sheet to be subjected to the heat treatment.

(IV) Yet another aspect of the present invention provides a core made of a laminated body of a soft magnetic steel sheet, wherein the soft magnetic steel sheet is the soft magnetic steel sheet according to the present invention described above.

(V) Still another aspect of the present invention provides a dynamo-electric machine including a core, wherein the core is the core according to the present invention described above.

Advantageous Effects of Invention

According to the present invention, it is possible to provide an iron-nitrogen-based soft magnetic steel sheet having a saturation magnetic flux density higher than that of pure iron and a method for manufacturing the soft magnetic steel sheet. In addition, by using the soft magnetic steel sheet, it is possible to provide a core having a conversion efficiency between an electric energy and a magnetic energy which is higher than that of a core using pure iron and a dynamo-electric machine.

DESCRIPTION OF EMBODIMENTS

[Basic Idea of Present Invention]

An electromagnetic steel sheet is a material which is typically a thin sheet material (having a thickness of, e.g. 0.03 to 1 mm), and a plurality of the electromagnetic steel sheets are laminated and molded to be used as a core of a dynamo-electric machine or a voltage inverter. To the core, it is important that a conversion efficiency between an electric energy and a magnetic energy is high, and a high magnetic flux density and a low iron loss are important. To increase the magnetic flux density, it is desirable that a saturation magnetic flux density Bs is high and, to reduce the iron loss, it is desirable that a coersive force Hc is small and thin sheet workability is excellent. As is obvious, reducing the cost of the core is one of important issues.

Pure iron is low-cost and has a high saturation magnetic flux density (2.14 T). An iron loss of the pure iron is Hc (80 A/m). A Fe—Si-based steel sheet obtained by doping the pure iron with about 1 to 3 mass % of silicon (Si) has a saturation magnetic flux density (2.0 T) slightly lower than that of the pure iron, but is low-cost and can have a significantly reduced coersive force. Meanwhile, a Fe—Co-based steel sheet in which about 50 mass % of Co is mixed exhibits a saturation magnetic flux density (2.4 T) sufficiently higher than that of the pure iron and a low coersive force, but is high in material cost as previously described.

Meanwhile, as a soft magnetic material exhibiting Bs higher than that of the pure iron, there is the $Fe_{16}N_2$ phase described above. However, since the $Fe_{16}N_2$ phase is a metastable compound phase, there are a large number of unexplained regions with regard to a manufacturing process, and most of various prior art technologies are targeted at powder materials.

Accordingly, using a low-cost starting material (e.g., a low-carbon steel sheet or an electromagnetic pure iron sheet) with use as an electromagnetic steel sheet in mind, the present inventors have intensively studied a process of stably manufacturing a Fe—N-based soft magnetic steel sheet. As a result, the present inventors found that, when a predetermined nitriding heat treatment was performed on the starting material to effect control such that an N concentration higher than a C concentration in the starting material was achieved, and then a predetermined nitride-phase-generating tempering treatment was performed, it was possible to allow an $\alpha$ phase to serve as a main phase and then achieve a 10% or more volume ratio of an $\alpha''$ phase and a 5% or less volume ratio of a $\gamma$ phase, and it was possible to stably manufacture a steel sheet having Bs higher than that of the pure iron and Hc equal to or less than that of the pure iron. The present invention was completed on the basis of the findings.

Referring to the drawings, the following will more specifically describe an embodiment according to the present invention. However, the present invention is not limited to the embodiment mentioned herein, and can appropriately be combined with a known technology or improved on the basis of the known technology within the scope not departing from the technical idea of the invention.

(Soft Magnetic Steel Sheet of Present Invention)

It is preferable that a soft magnetic steel sheet of the present invention includes C, N, and the balance of Fe and inevitable impurities and is comprised of an α phase (a ferrite phase, a cubical crystal), an α' phase (an irregular martensite phase, a $Fe_8N$ phase, a tetragonal crystal), an α" phase (a regular martensite phase, a $Fe_{16}N_2$ phase, a tetragonal phase), and a γ phase (an austenite phase, a cubical crystal), the α phase serves as a main phase, a volume ratio of the α" phase is 10% or more, and a volume ratio of the γ phase is 5% or less. The volume ratio of the α" phase is more preferably 15% or more, while the volume ratio of the γ phase is more preferably 3% or less.

Note that the main phase means α phase having a highest volume ratio. The volume ratio of the α' phase is not particularly limited but, since the α' phase may possibly be formed at a stage previous to formation of the α" phase, the volume ratio of the α' phase is preferably 10% or more.

When the volume ratio of the α" phase is less than 10%, it becomes difficult for Bs of the soft magnetic steel sheet to exceed Bs (2.14 T) of the pure iron. Meanwhile, since the γ phase is nearly non-magnetic, when the volume ratio of the γ phase exceeds 5%, the volume ratio of the α phase is reduced, and also it becomes difficult for Bs of the soft magnetic steel sheet to exceed Bs of the pure iron.

To achieve the configuration described above, it is preferable that a total concentration of C and N is at least 0.01 at % and at most 10 at %, and an N concentration is higher than a C concentration. The N concentration is more preferably double the C concentration or more, and still more preferably triple the C concentration or more. In addition, the N concentration is preferably 9 at % or less, while the C concentration is preferably 1.2 at % or less (0.25 mass % or less).

When the total concentration of C and N is less than 0.01 at %, the volume ratio of the α" phase does not reach 10%, and it becomes difficult for Bs of the soft magnetic steel sheet to exceed Bs of the pure iron. Meanwhile, when the total concentration of C and N exceeds 10 at %, the volume ratio of the γ phase exceeds 5%, and accordingly it becomes difficult for Bs of the soft magnetic steel sheet to exceed Bs of the pure iron.

Note that the inevitable impurities (impurities included in the starting material such as, e.g., hydrogen (H), boron (B), Si, phosphorus (P), sulfur (S), chromium (Cr), manganese (Mn), nickel (Ni), and copper (Cu)) are permitted within a range (e.g., a total concentration of 3 at % or less) that does not particularly adversely affect Bs of the soft magnetic steel sheet.

In the soft magnetic steel sheet of the present invention, at least the α" phase is preferably a crystal phase in which, when a ratio "c/a" of a c-axis length to an a-axis length as a lattice constant is measured by an X-ray diffraction method, the ratio "c/a" is different from "c/a=1.10" of $Fe_{16}N_2$ having a stoichiometric composition. This means that an α" phase crystal lattice is averagely distorted. In contrast to a $Fe_{16}N_2$ crystal having the stoichiometric composition, the lattice constant is distorted due to deficiency of an N atom or entrance of a C atom, and accordingly an increased magnetic moment is more expectable than from an undistorted crystal lattice.

Note that the α phase of the soft magnetic steel sheet of the present invention conceivably has both of the C atom and the N atom that have entered the crystal lattice and conceivably has a lattice constant different from a lattice constant of an a-Fe phase in a Fe—C-based state diagram and a lattice constant of the a-Fe phase in a Fe—N-based state diagram. This leads to average distortion of the α phase crystal lattice in the soft magnetic steel sheet. In the same manner as described above, due to the distortion of the crystal lattice even in the α phase, increased magnetization is more expectable than from the undistorted crystal lattice.

By having a configuration as described above, the present invention can provide an iron-nitrogen-based soft magnetic steel sheet that exhibits magnetic properties which are Bs (over 2.14 T) exceeding that of the pure iron and the coersive force Hc (e.g., 80 A/m or less) approximately equal to or less than that of the pure iron.

(Core and Dynamo-Electric Machine Each Using Soft Magnetic Steel Sheet of Present Invention)

Figure 1:
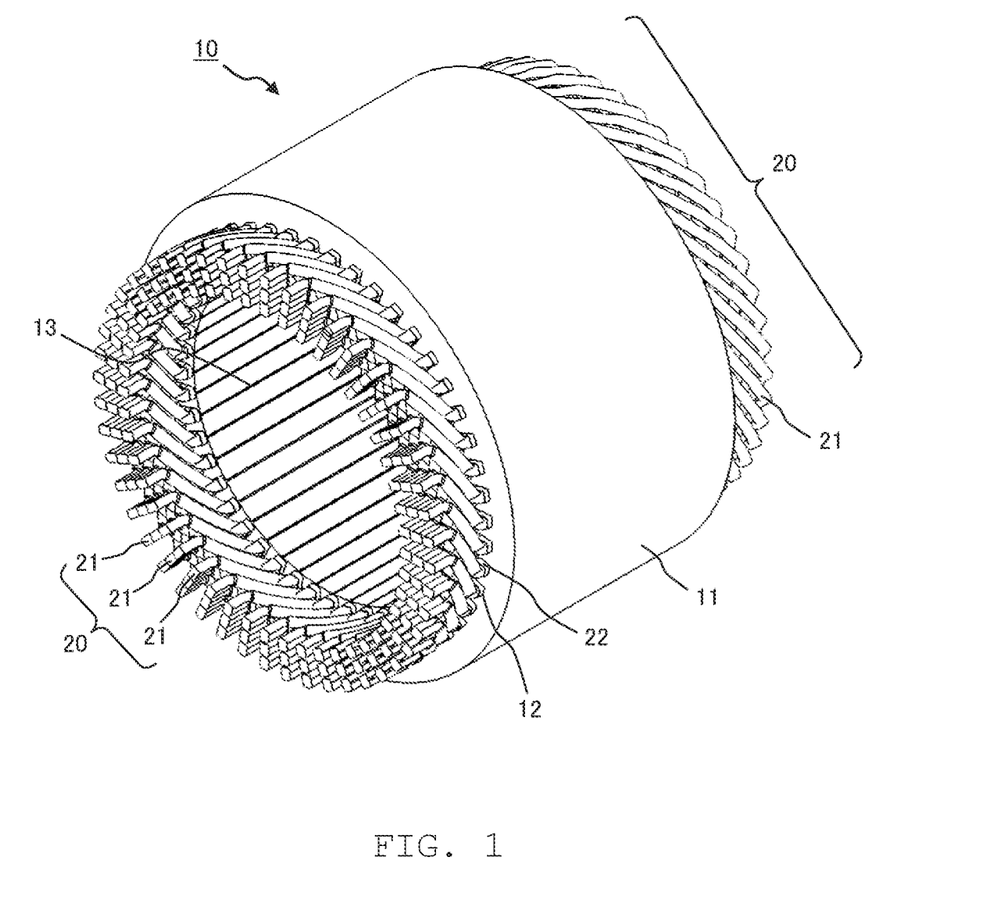
FIG. 1 is a perspective diagram illustrating an example of a stator of a dynamo-electric machine.
Figure 2:
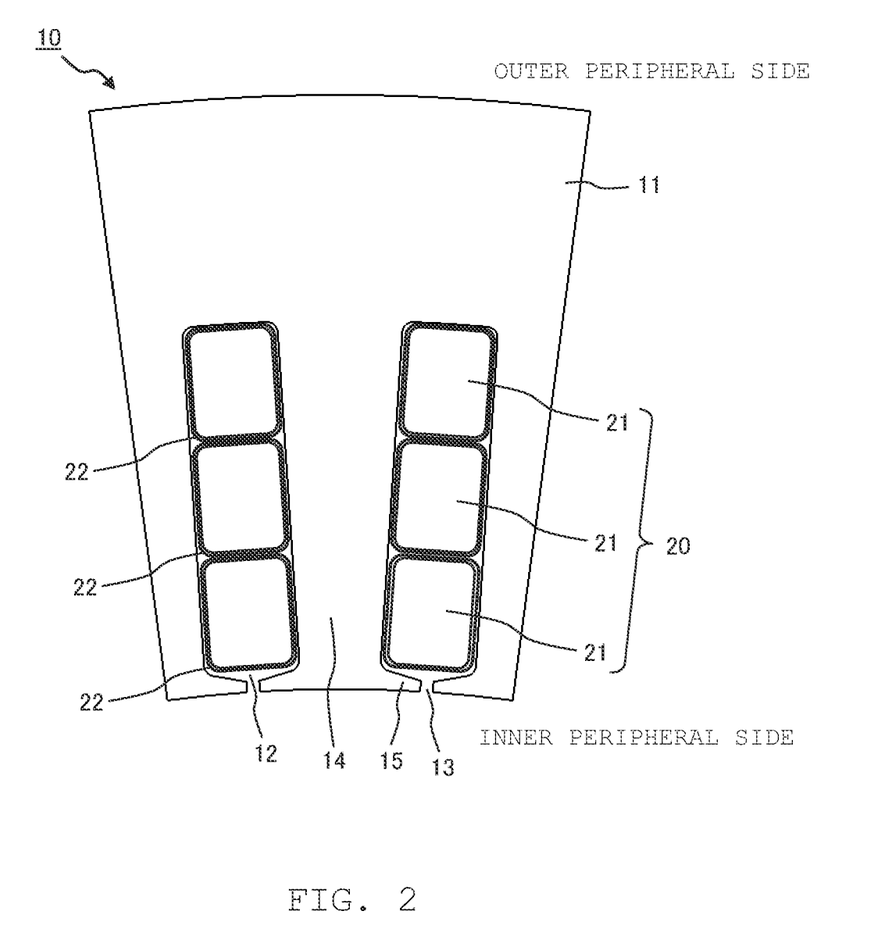
FIG. 2 is an enlarged horizontal cross-sectional diagram of a slot region of the stator.

FIG. 1 is a perspective diagram illustrating an example of a stator of a dynamo-electric machine, and FIG. 2 is an enlarged horizontal cross-sectional diagram of a slot region of the stator. Note that a horizontal cross section means a cross section perpendicular to a rotation axis direction (cross section having a normal line parallel with an axial direction). In the dynamo-electric machine, a rotator (not shown) is disposed on a radially inner side of the stator in FIGS. 1 and 2.

As illustrated in FIGS. 1 and 2, a stator 10 is obtained by winding a stator coil 20 around a plurality of stator slots 12 formed on an inner peripheral side of a core 11. The stator slots 12 are spaces formed to be arranged with a predetermined peripheral pitch in a peripheral direction of the core 11 to extend through the core 11 in the axial direction and, in innermost peripheral portions thereof, slits 13 extending in the axial direction are formed to be open. Regions separating the adjacent stator slots 12 are referred to as teeth 14 of the core 11, while portions defining the slits 13 in inner peripheral leading end regions of the teeth 14 are referred to as teeth nail portions 15.

The stator coil 20 typically includes a plurality of segment conductors 21. For example, in FIGS. 1 and 2, the stator coil 20 includes the three segment conductors 21 corresponding to a U phase, a V phase, and a W phase of a three phase alternating current. In addition, in terms of preventing partial discharge between the segment conductors 21 and the core 11 and partial discharge between the individual phases (the U phase, the V phase, and the W phase), each of the segment conductors 21 typically has an outer periphery thereof covered with an electrically insulating material 22 (e.g., an insulating sheet or enamel coating).

The core and the dynamo-electric machine each using the soft magnetic steel sheet of the present invention are the core 11 formed by laminating, in the axial direction, a large number of the soft magnetic steel sheets of the present invention molded into a predetermined shape and the dynamo-electric machine using the core 11. As described above, the soft magnetic steel sheet of the present invention exhibits the magnetic properties which are the saturation magnetic flux density Bs exceeding that of the pure iron and the coersive force Hc approximately equal to or less than that of the pure iron. Therefore, it is possible to provide the core having a conversion efficiency between an electric energy and a magnetic energy which is higher than that of a conventional core using an electromagnetic steel sheet. The high-efficiency iron core leads to a smaller size and a higher torque of the dynamo-electric machine.

In addition, the soft magnetic steel sheet of the present invention can use a low-carbon steel sheet, an electromagnetic pure iron sheet, or the like lower in material cost than a Fe—Co-based steel sheet, and accordingly has an advantage of being able to provide such a high-efficiency core and a dynamo-electric machine at lower cost.

(Method for Manufacturing Soft Magnetic Steel Sheet of Present Invention)

Next, a description will be given of a method for manufacturing the soft magnetic steel sheet described above.

The method for manufacturing the soft magnetic steel sheet according to the present invention is first characterized in that a low-cost sheet material (e.g., a low-carbon steel sheet or an electromagnetic pure iron sheet) is used as a starting material. The manufacturing method is further characterized in that, after a nitriding treatment step of performing a predetermined nitriding heat treatment on the starting material to effect control such that an N concentration higher than a C concentration in the starting material is achieved is performed, an iron-nitride-phase generating step of performing a predetermined tempering heat treatment to generate and disperse iron nitride phases, which are an α' phase and an α" phase, in the α phase serving as a main phase.

The low-carbon steel sheet (having the C concentration of 0.25 mass % or less) and the electromagnetic pure iron sheet (having a C concentration of 0.03 mass % or less) are industrially widely used materials and available at low cost. Since these steel sheets have low C contents, control of the N concentrations in the steel sheets in the nitriding heat treatment (control to achieve the N concentrations higher than the C concentrations) becomes relatively easy to contribute also to a reduction in process cost. In addition, in terms of mass productivity, it is preferable to use an elongated sheet (a sheet material which allows a longitudinal direction and a width direction to be clearly distinguished from each other).

With regard to the nitriding heat treatment, the following three types of processes are preferably used as appropriate.

The first process is a first nitriding heat treatment in which, after a first heat treatment of introducing and diffusing N atoms till an intended N concentration is reached in a temperature range of at least an $A_1$ transformation point (592° C.) in the Fe—N-based state diagram and less than an $A_3$ transformation point in the Fe—C-based state diagram (911° C.) and in a predetermined ammonia gas atmosphere environment is performed, cooling to a predetermined tempering temperature (at least 100° C. and at most 210° C.) is immediately performed. As the ammonia gas atmosphere, a mixed gas of an ammonia ($NH_3$) gas and a nitrogen ($N_2$) gas or a mixed gas of an $NH_3$ gas and a hydrogen ($H_2$) gas can be used appropriately. The temperature range of at least the $A_1$ transformation point is a temperature region in which the γ phase may be generated.

The second process is a second nitriding heat treatment in which, after the first heat treatment described above is performed, rapid cooling to a temperature less than the tempering temperature (less than 100° C.) is performed to effect quenching. A quenching method is not particularly limited, and an existing method (e.g., water cooling, oil cooling, or gas cooling) can be used appropriately. By performing quenching from a temperature equal to or more than the $A_1$ transformation point, it is possible to cause a martensite transformation in the γ phase.

The third process is a third nitriding heat treatment in which, after a second heat treatment of introducing and diffusing N atoms till an intended N concentration is reached in a temperature range of less than the $A_1$ transformation point (592° C.) in the Fe—N state diagram and in a predetermined ammonia gas atmosphere is performed at 500° C. or more, rapid cooling to a temperature less than the tempering temperature is performed to effect quenching. The ammonia gas atmosphere is the same as that in the first nitriding heat treatment, and the quenching method is the same as in the second nitriding heat treatment. The temperature less than the $A_1$ transformation point is not in a temperature range where the γ phase stably exists but, when the γ phase exists/remains in a raw material sheet, by performing the quenching, it is possible to cause a martensite transformation in the γ phase.

In the second and third processes, after the quenching is performed, it may also be possible to additionally perform a sub-zero treatment (treatment of performing cooling to a temperature equal to or less than 0° C.). When the γ phase remains in the quenched material, by performing the sub-zero treatment, it is possible to further reduce the remaining γ phase.

As the tempering heat treatment after the nitriding heat treatment is performed, a heat treatment of retaining the material to be subjected to the heat treatment in a temperature range of at least 100° C. and at most 210° C. during an appropriate period of time is preferred. The retention time may be set appropriately in consideration of the tempering temperature and a heat capacity of the material to be subjected to the heat treatment. As a result of performing the tempering heat treatment, a transformation from the γ phase to the α phase or a transformation from a martensite structure to the α phase occurs, while the iron nitride phases which are the α' phase and the α" phase are generated and dispersed in the α phase serving as the main phase. The atmosphere for the tempering heat treatment is not particularly limited but, in terms of inhibiting undesirable oxidation of the material to be subjected to the heat treatment, a non-oxidizing atmosphere (e.g., an $N_2$ gas, an Ar gas, or a $H_2$ gas) can be used appropriately.

It is considered that, in the nitriding heat treatment, C atoms in the raw material steel sheet and the N atoms introduced and dispersed therein are substantially evenly dispersed/solid-dissolved in the crystal phases (α phase and γ phase). Then, when the sheet material in which the N atoms have been introduced and diffused is tempered, in a process of the transformation from the γ phase to the α phase or a process of the transformation from the martensite structure to the α phase, a distribution variation/concentration distribution such as spinodal decomposition conceivably occurs in each of a C atom distribution and an N atom distribution and, due to the concentration distribution, the iron nitride phases are conceivably generated to be dispersed. It is considered that, since the generation of the iron nitride phases is based on the distribution variation/concentration distribution of each of the C atoms and the N atoms, a $Fe_8N$ crystal or the $Fe_{16}N_2$ crystal having the stoichiometric composition is not formed, but the α' phase and α" phase each having the distorted crystal lattice are formed instead. It is also considered that, in the α phase also, a crystal lattice is in a distorted state.

It is more preferable that, when a nitriding heat treatment and/or a tempering heat treatment is performed, a stress field and/or an electromagnetic field is applied to the sheet to be subjected to the heat treatment. As the stress field, a tensile stress in the longitudinal direction of the sheet to be subjected to the heat treatment or a compression stress in a thickness direction thereof can be used appropriately. As the electromagnetic field, for example, a static magnetic field or a dynamic magnetic field formed by an electromagnet can be used appropriately. It is considered that applying the stress field and/or the electromagnetic field acts to accelerate diffusion/distribution variation of the C atoms and the N atoms by directly/indirectly distorting lattice crystals. As a result, an effect of accelerating formation of the iron nitride phases and the α phase each having the distorted crystal lattice is achieved.

The heating device for performing the nitriding heat treatment and the tempering heat treatment is not particularly limited, and an existing heating device (e.g., a resistance heating furnace or a high-frequency induction heating furnace) can be used appropriately. Note that, when the high-frequency induction heating furnace is used, since a high temperature elevation speed can be achieved, an advantage that a heat treatment period can be reduced is offered. In addition, since the heating method uses the electromagnetic field, an advantage that a function/effect similar to that achieved by the application of the electromagnetic field described above can be expected is offered.

Figure 3:
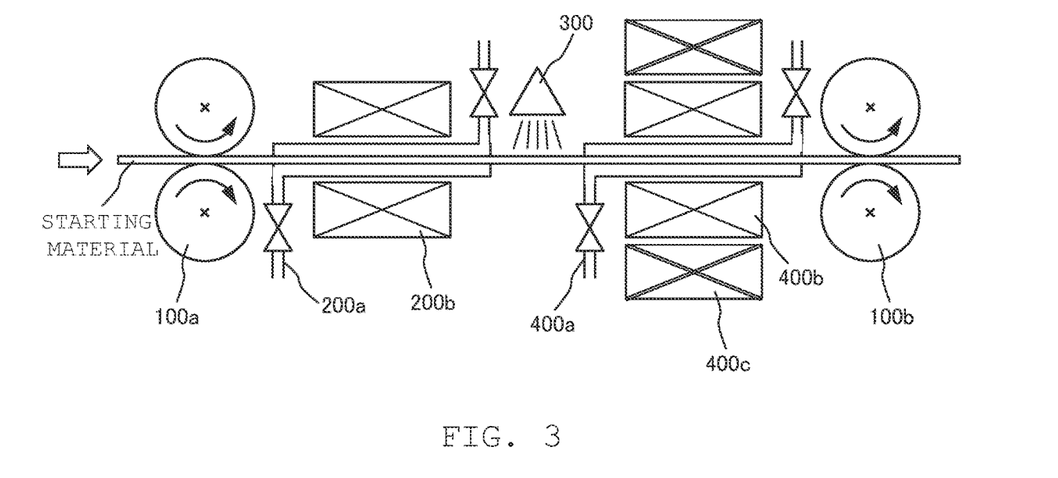
FIG. 3 is a schematic diagram illustrating an example of a configuration of a device for manufacturing a soft magnetic steel sheet of the present invention.

FIG. 3 is a schematic diagram illustrating an example of a configuration of a device for manufacturing the soft magnetic steel sheet of the present invention. The manufacturing device illustrated in FIG. 3 is configured to be able to apply a stress field (a compression stress and/or a tensile stress) to a starting material, while transporting the starting material by using a combination of roll mechanisms 100*a* and 100*b*, perform a nitriding heat treatment, while controlling an atmosphere by using a combination of an atmosphere control mechanism 200*a* and a heating mechanism 200*b*, perform quenching on the starting material after being subjected to the nitriding heat treatment by using a cooling mechanism 300, and perform a tempering heat treatment, while controlling the atmosphere and applying an electromagnetic field by using a combination of an atmosphere control mechanism 400*a*, a heating mechanism 400*b*, and an electromagnetic field application mechanism 400*c*.

EXAMPLES

The following will more specifically describe the present invention by using various examples. However, the present invention is not limited to configurations/structures described in these examples.

Example 1

As a starting material, a commercially available low-carbon steel sheet (having a thickness of 0.1 mm and a C concentration of 0.5 at %) was prepared. On the starting material, a first heat treatment of retaining the starting material in an ammonia gas atmosphere (a 50% $NH_3$-50% $N_2$ gas at one atmospheric pressure) at 750° C. for 10 hours was performed, and then a first nitriding heat treatment of allowing a 100% $N_2$ gas to flow and cool the steel sheet to 200° C. was performed. Then, a tempering heat treatment of retaining the steel sheet at 200° C. for one hour was performed to produce a soft magnetic steel sheet in Example 1. As a heating device for performing the nitriding heat treatment and the tempering heat treatment, a resistance heating furnace was used.

From the soft magnetic steel sheet obtained in Example 1, specimens for various property examinations were collected, and C concentrations, N concentrations, and detected phases were identified, while volume ratios among the α' phase, the α" phase, and the γ phase, "c/a" of the α" phase, and magnetic properties were examined.

For the C concentrations and the N concentrations, concentration profiles from surfaces of samples to a depth of 50 μm (unit: at %) were measured by a glow discharge optical emission spectrometric method (GD-OES), and the components concentrations were determined from average values thereof. As a result of the GD-OES measurement, the C concentration was 0.5 at %, and the N concentration was 2 at %. Accordingly, a ratio of the N concentration to the C concentration "N Concentration/C concentration" is 4.

For the volume ratio among the α' phase, the α" phase, and the γ phase, on the surfaces of the samples, wide-angle X-ray diffraction measurement (WAXD) using a Mo-Kα ray and a Cu-Kα ray was performed and, using profile fitting, detected phases were identified and integral intensities of individual diffraction peaks were calculated. Then, the integral intensities were corrected using a sensitivity coefficient listed in standard data and, from a ratio among the integral intensities, the volume ratio among the α' phase, the α" phase, and the γ phase was determined. In addition, from the diffraction peak of the α" phase, the ratio "c/a" of a c-axis length to an a-axis length as a lattice constant of the α" phase was calculated.

As a result of the WAXD measurement, in Example 1, the diffraction peaks of the α phase, the α' phase, and the α" phase were detected, the α' phase had 30 vol %, the α" phase had 20 vol %, the γ phase had 0.5 vol %, and the "c/a" of the α" phase was 1.04.

For the magnetic properties, using a vibrating-sample-type magnetometer (VSM, BHV-525H from Riken Denshi Co., Ltd.), magnetization (unit: emu) of the samples was measured under a magnetic field of 1.6 MA/m and at a temperature of 20° C. and, from sample volumes and sample masses, saturation magnetic flux densities Bs (unit: T) and coersive forces Hc (unit: A/m) were determined. Additionally, as Reference Example 1, Bs of a low-carbon steel sheet (having the C concentration of 0.5 at %) serving as a starting material was also determined. As a result of the VSM measurement, the soft magnetic steel sheet in Example 1 had Bs of 2.22 T and Hc of 70 A/m. The low-carbon steel sheet in Reference Example 1 had Bs of 2.12 T.

Specifications and measurement results in Example 1 and Reference Example 1 are summarized in Table 1 described later.

Example 2

The same low-carbon steel sheet (having a thickness of 0.1 mm and a C concentration of 0.5 at %) as prepared in Example 1 was prepared. After the same first nitriding heat treatment as performed in Example 1 was performed on the starting material, a tempering heat treatment of allowing a 100% $N_2$ gas to flow and cool the steel sheet to 200° C. and retaining the steel sheet at 200° C. for one hour was performed in the same manner as in Example 1 except that a magnetic field (10 kOe) was applied to the sheet being heat-treated in the width direction thereof during the tempering heat treatment, thereby producing a soft magnetic steel sheet in Example 2.

From the soft magnetic steel sheet obtained in Example 2, specimens for various property examinations were collected and, in the same manner as in Example 1, C concentrations, N concentrations, and detected phases were identified, while the volume ratios among the α' phase, the α" phase, and the γ phase, the "c/a" of the α" phase, and the magnetic properties were examined.

As a result of the GD-OES measurement, in the same manner as in Example 1, the C concentration was 0.5 at %, the N concentration was 2 at %, and the "N Concentration/C concentration" was 4. As a result of the WAXD measurement, the diffraction peaks of the α phase, the α' phase, the α" phase, and the γ phase were detected, the α' phase had 20 vol %, the α" phase had 20 vol %, the γ phase had 0.4 vol %, and the "c/a" of the α" phase was 1.04. As a result of the VSM measurement, the soft magnetic steel sheet in Example 2 had Bs of 2.26 T and Hc of 70 A/m. As a result of applying the magnetic field to the sheet being heat-treated during the tempering heat treatment, a function/effect of increasing Bs was recognized.

Specifications and measurement results in Example 2 are listed together in Table 1 described later.

Example 3

The same low-carbon steel sheet (having a thickness of 0.1 mm and a C concentration of 0.5 at %) as prepared in Example 1 was prepared. After the same first nitriding heat treatment as performed in Example 1 was performed on the starting material, a tempering heat treatment of allowing a 100% N₂ gas to flow and cool the steel sheet to 200° C. and retaining the steel sheet at 200° C. for one hour was performed in the same manner as in Example 1 except that a tensile stress (196 MPa) was applied to the sheet being heat-treated in the longitudinal direction thereof during the tempering heat treatment, thereby producing a soft magnetic steel sheet in Example 3.

From the soft magnetic steel sheet obtained in Example 3, specimens for various property examinations were collected and, in the same manner as in Example 1, C concentrations, N concentrations, and detected phases were identified, while the volume ratios among the α' phase, the α" phase, and the γ phase, the "c/a" ratios of the α" phase, and the magnetic properties were examined.

As a result of the GD-OES measurement, in the same manner as in Example 1, the C concentration was 0.5 at %, the N concentration was 2 at %, and the "N Concentration/C concentration" was 4. As a result of the WAXD measurement, the diffraction peaks of the α phase, the α' phase, the α" phase, and the γ phase were detected, the α' phase had 35 vol %, the α" phase had 25 vol %, the γ phase had 0.2 vol %, and the "c/a" of the α" phase was 1.06. As a result of the VSM measurement, the soft magnetic steel sheet in Example 3 had Bs of 2.32 T and Hc of 60 A/m. As a result of applying the stress to the sheet being heat-treated during the tempering heat treatment, a function/effect of increasing Bs was recognized.

Specifications and measurement results in Example 3 are listed together in Table 1 described later.

Example 4

The same low-carbon steel sheet (having a thickness of 0.1 mm and a C concentration of 0.5 at %) as prepared in Example 1 was prepared. After the same first nitriding heat treatment as performed in Example 1 was performed on the starting material, a tempering heat treatment of allowing a 100% N₂ gas to flow and cool the steel sheet to 200° C. and retaining the steel sheet at 200° C. for 24 hours was performed in the same manner as in Example 1 except that a tensile stress (196 MPa) was applied to the sheet being heat-treated in the longitudinal direction and a magnetic field (10 kOe) was also applied to the sheet being heat-treated in the width direction during the tempering heat treatment, thereby producing a soft magnetic steel sheet in Example 4.

From the soft magnetic steel sheet obtained in Example 4, specimens for various property examinations were collected and, in the same manner as in Example 1, C concentrations, N concentrations, and detected phases were identified, while the volume ratios among the α' phase, the α" phase, and the γ phase, the "c/a" of the α" phase, and the magnetic properties were examined.

As a result of the GD-OES measurement, in the same manner as in Example 1, the C concentration was 0.5 at %, the N concentration was 2 at %, and the "N Concentration/C concentration" was 4. As a result of the WAXD measurement, the diffraction peaks of the α phase, the α' phase, the α" phase, and the γ phase were detected, the α' phase had 30 vol %, the α" phase had 15 vol %, the γ phase volume ratio was 0.5 vol %, and the "c/a" of the α" phase was 1.06. As a result of the VSM measurement, the soft magnetic steel sheet in Example 4 had Bs of 2.39 T and Hc of 70 A/m. As a result of combining the application of the stress with the application of the magnetic field to the sheet being heat-treated during the tempering heat treatment, a function/effect of further increasing Bs was recognized.

Specifications and measurement results in Example 4 are listed together in Table 1 described later.

Example 5

The same low-carbon steel sheet (having a thickness of 0.1 mm and a C concentration of 0.5 at %) as prepared in Example 1 was prepared. After the same first heat treatment as performed in Example 1 was performed on the starting material, a second nitriding heat treatment of quenching the steel sheet by water cooling was performed. Then, on the quenched material, a sub-zero treatment (in this case, referred to also as a super sub-zero treatment) using liquid nitrogen was performed, and then a tempering heat treatment of retaining the steel sheet at 150° C. for one hour was performed, thereby producing a soft magnetic steel sheet in Example 5.

From the soft magnetic steel sheet obtained in Example 5, specimens for various property examinations were collected and, in the same manner as in Example 1, C concentrations, N concentrations, and detected phases were identified, while the volume ratios among the α' phase, the α" phase, and the γ phase, the "c/a" of the α" phase, and the magnetic properties were examined.

As a result of the GD-OES measurement, in the same manner as in Example 1, the C concentration was 0.5 at %, the N concentration was 2 at %, and the "N Concentration/C concentration" was 4. As a result of the WAXD measurement, the diffraction peaks of the α phase, the α' phase, the α" phase, and the γ phase were detected, the α' phase had 20 vol %, the α" phase had 25 vol %, the γ phase volume ratio was 0.3 vol %, and the "c/a" of the α" phase was 1.07. As a result of the VSM measurement, the soft magnetic steel sheet in Example 5 had Bs of 2.28 T and Hc of 80 A/m. As a result of combining the quenching with the sub-zero treatment, a function/effect of providing the γ phase volume ratio smaller than that of the soft magnetic steel sheet in Example 1 and Bs larger than that of the soft magnetic steel sheet in Example 1 was recognized.

Specifications and measurement results in Example 5 are listed together in Table 1 described later.

Example 6

A commercially available low-carbon steel sheet (having a thickness of 0.1 mm and a C concentration of 1 at %) other than that prepared in Example 1 was prepared. On the starting material, a first heat treatment of retaining the starting material in an ammonia gas atmosphere (50% $NH_3$-50% $N_2$ gas at one atmospheric pressure) at 750° C. for one hour was performed, and then a second nitriding heat treatment of quenching the steel sheet by $N_2$ gas cooling was performed. Then, a tempering heat treatment of retaining the steel sheet at 200° C. for 10 hours, while applying a tensile stress (98 MPa) to the quenched material in the longitudinal direction thereof, was performed to produce a soft magnetic steel sheet in Example 6.

From the soft magnetic steel sheet obtained in Example 6, specimens for various property examinations were collected and, in the same manner as in Example 1, C concentrations, N concentrations, and detected phases were identified, while the volume ratios among the $\alpha'$ phase, the $\alpha''$ phase, and the $\gamma$ phase, the "c/a" of the $\alpha''$ phase, and the magnetic properties were examined. Additionally, as Reference Example 2, Bs of the low-carbon steel sheet (having the C concentration of 1 at %) serving as a starting material was also determined.

As a result of the GD-OES measurement, in the same manner as in Example 1, the C concentration was 1 at %, the N concentration was 5 at %, and the "N Concentration/C concentration" was 5. As a result of the WAXD measurement, the diffraction peaks of the $\alpha$ phase, the $\alpha'$ phase, the $\alpha''$ phase, and the $\gamma$ phase were detected, the $\alpha'$ phase had 15 vol %, the $\alpha''$ phase had 20 vol %, the $\gamma$ phase volume ratio was 1 vol %, and the "c/a" of the $\alpha''$ phase was 1.05. As a result of the VSM measurement, the soft magnetic steel sheet in Example 6 had Bs of 2.30 T. The low-carbon steel sheet in Reference Example 2 had Bs of 2.09 T.

Specifications and measurement results in Example 6 and Reference Example 2 are listed together in Table 1 described later.

Example 7

The same low-carbon steel sheet (having a thickness of 0.1 mm and a C concentration of 1 at %) as prepared in Example 6 was prepared. On the starting material, a first nitriding heat treatment of retaining the starting material in an ammonia gas atmosphere (50% $NH_3$-50% $N_2$ gas at one atmospheric pressure) at 750° C. for 0.5 hours was performed, and then a second nitriding heat treatment of quenching the steel sheet by $N_2$ gas cooling was performed. Then, a tempering heat treatment of retaining the steel sheet at 200° C. for one hour, while applying a tensile stress (98 MPa) to the quenched material in the longitudinal direction thereof, was performed to produce a soft magnetic steel sheet in Example 7. In Example 7, as a heating device for performing the nitriding heat treatment and the tempering heat treatment, a high-frequency induction heating furnace was used.

From the soft magnetic steel sheet obtained in Example 7, specimens for various property examinations were collected and, in the same manner as in Example 1, C concentrations, N concentrations, and detected phases were identified, while the volume ratios among the $\alpha'$ phase, the $\alpha''$ phase, and the $\gamma$ phase, the "c/a" of the $\alpha''$ phase, and the magnetic properties were examined.

As a result of the GD-OES measurement, in the same manner as in Example 6, the C concentration was 1 at %, the N concentration was 5 at %, and the "N Concentration/C concentration" was 5. As a result of the WAXD measurement, the diffraction peaks of the $\alpha$ phase, the $\alpha'$ phase, the $\alpha''$ phase, and the $\gamma$ phase were detected, the $\alpha'$ phase had 20 vol %, the $\alpha''$ phase had 25 vol %, the $\gamma$ phase volume ratio was 3 vol %, and the "c/a" of the $\alpha''$ phase was 1.05. As a result of the VSM measurement, the soft magnetic steel sheet in Example 7 had Bs of 2.30 T. It was recognized that, by using the high-frequency induction heating furnace as the heating device, it was possible to obtain properties equal to those obtained in Example 6 in a shorter period of time.

Specifications and measurement results in Example 7 are listed together in Table 1 described later.

Example 8

A commercially available electromagnetic pure iron sheet (having a thickness of 0.05 mm and a C concentration of 0.01 at %) other than that prepared in Example 1 was prepared. On the starting material, a second heat treatment of retaining the starting material in an ammonia gas atmosphere (80% $NH_3$-20% $H_2$ gas at one atmospheric pressure) at 580° C. for 10 hours was performed, and then a third nitriding heat treatment of quenching the sheet by water cooling was performed. Then, a tempering heat treatment of retaining the sheet at 150° C. for 10 hours, while applying a tensile stress (98 MPa) to the quenched material in the longitudinal direction thereof and applying a magnetic field (10 kOe) to the sheet in the thickness direction thereof, was performed to produce a soft magnetic steel sheet in Example 8. As a heating device for performing the nitriding heat treatment and the tempering heat treatment, a resistance heating furnace was used.

From the soft magnetic steel sheet obtained in Example 8, specimens for various property examinations were collected and, in the same manner as in Example 1, C concentrations, N concentrations, and detected phases were identified, while the volume ratios among the $\alpha'$ phase, the $\alpha''$ phase, and the $\gamma$ phase, the "c/a" of the $\alpha''$ phase, and the magnetic properties were examined. Additionally, as Reference Example 3, Bs of the electromagnetic pure iron sheet (having the C concentration of 0.01 at %) serving as the starting material was also determined.

As a result of the GD-OES measurement, the C concentration was 0.01 at %, the N concentration was 0.5 at %, and the "N Concentration/C concentration" was 50. As a result of the WAXD measurement, the diffraction peaks of the $\alpha$ phase, the $\alpha'$ phase, and the $\alpha''$ phase were detected, but the diffraction peak of the $\gamma$ phase was not detected. The $\alpha'$ phase had 20 vol %, the $\alpha''$ phase had 25 vol %, the $\gamma$ phase volume ratio was 0 vol %, and the "c/a" of the $\alpha''$ phase was 1.06. As a result of the VSM measurement, the soft magnetic steel sheet in Example 8 had Bs of 2.30 T and Hc of 80 A/m. The electromagnetic pure iron sheet in Reference Example 3 had Bs of 2.14 T.

It can be considered that, since a process of manufacturing the soft magnetic steel sheet was a combination of the nitriding heat treatment which goes through neither a temperature region less than a $A_1$ transformation point (592° C.) in a Fe—N-based state diagram nor the $\gamma$ phase resulting from quenching, and the tempering heat treatment, the $\gamma$ phase volume ratio was 0 vol %.

Specifications and measurement results in Example 8 and Reference Example 3 are listed together in Table 1 described later.

Example 9

An electromagnetic pure iron sheet different in thickness from that prepared in Example 8 (having a thickness of 0.1 mm and a C concentration of 0.01 at %) was prepared. On the starting material, a second heat treatment of retaining the starting material in an ammonia gas atmosphere (80% $NH_3$-20% $H_2$ gas at a 0.5 atmospheric pressure) at 580° C. for 10 hours, while applying a tensile stress (98 MPa) to the starting material in the longitudinal direction thereof, was performed, and then a third nitriding heat treatment of quenching the sheet by water cooling was performed. Then, a tempering heat treatment of retaining the sheet at 150° C. for one hour, while applying a magnetic field (10 kOe) to the sheet in the width direction thereof, was performed to produce a soft magnetic steel sheet in Example 9.

From the soft magnetic steel sheet obtained in Example 9, specimens for various property examinations were collected and, in the same manner as in Example 1, C concentrations, N concentrations, and detected phases were identified, while the volume ratios among the α' phase, the α" phase, and the γ phase, the "c/a" of the α" phase, and the magnetic properties were examined.

As a result of the GD-OES measurement, the C concentration was 0.01 at %, the N concentration was 1.5 at %, and the "N Concentration/C concentration" was 150. As a result of the WAXD measurement, the diffraction peaks of the α phase, the α' phase, and the α" phase were detected, but the diffraction peak of the γ phase was not detected. The α' phase had 25 vol %, the α" phase had 30 vol %, the γ phase volume ratio was 0 vol %, and the "c/a" of the α" phase was 1.05. As a result of the VSM measurement, the soft magnetic steel sheet in Example 9 had Bs of 2.30 T and Hc of 50 A/m.

It can be considered that, due to the application of the stress field to the sheet being heat-treated in the nitriding heat treatment, N atoms were introduced/diffused to reach the N concentration higher than the N concentration in Example 8.

Specifications and measurement results in Example 9 are listed together in Table 1.

The above-described embodiment and Examples have been described to help with understanding on the present invention, and the present invention is not limited to the specific configurations described above. For example, a part of a configuration of the embodiment can be replaced with a configuration technically commonly known to a person skilled in the art, or a configuration technically commonly known to a person skilled in the art can also be added to the configuration of the embodiment. In other words, a part of the configuration of the embodiment or an experiment example in the present description can be deleted, replaced with another configuration, or added with another configuration within a scope not departing from the technical idea of the invention.

LIST OF REFERENCE SIGNS

10 . . . Stator;
11 . . . Core;
12 . . . Stator slot;
13 . . . Slit;
14 . . . Teeth;
15 . . . Teeth nail portion;
20 . . . Stator coil;
21 . . . Segment conductor;
22 . . . Electric insulating material;
100a, 100b . . . Roll mechanism;
200a . . . Atmosphere control mechanism;
200b . . . Heating mechanism;
300 . . . Cooling mechanism;
400a . . . Atmosphere control mechanism;
400b . . . Heating mechanism; and
400c . . . Electromagnetic field application mechanism.

The invention claimed is:

1. A soft magnetic steel sheet comprising:
carbon, nitrogen, and the balance of Fe and inevitable impurities, wherein
the soft magnetic steel sheet comprises an a phase, an α' phase, an α" phase, and a γ phase,
the α phase serves as a main phase having a highest volume ratio among the α phase, an α' phase, an α" phase, and a γ phase,
a volume ratio of the α" phase is 10% or more,
a volume ratio of the γ phase is 5% or less,

TABLE 1

Specifications and Measurement Results in Examples 1-9 and Reference Examples 1-3.

| | C Concentration (at %) | N Concentration (at %) | N/C Concentration Ratio | α' Phase (vol. %) | α" Phase (vol. %) | γ Phase (vol. %) | c/a of α" Phase | Bs (T) | Hc (A/m) |
|---|---|---|---|---|---|---|---|---|---|
| Reference Example 1 | 0.5 | — | — | — | — | — | — | 2.12 | — |
| Example 1 | 0.5 | 2 | 4 | 30 | 20 | 0.5 | 1.04 | 2.22 | 70 |
| Example 2 | 0.5 | 2 | 4 | 20 | 20 | 0.4 | 1.04 | 2.26 | 70 |
| Example 3 | 0.5 | 2 | 4 | 35 | 25 | 0.2 | 1.06 | 2.32 | 60 |
| Example 4 | 0.5 | 2 | 4 | 30 | 15 | 0.5 | 1.06 | 2.39 | 70 |
| Example 5 | 0.5 | 2 | 4 | 20 | 25 | 0.3 | 1.07 | 2.28 | 80 |
| Reference Example 2 | 1 | — | — | — | — | — | — | 2.09 | — |
| Example 6 | 1 | 5 | 5 | 15 | 20 | 1 | 1.05 | 2.30 | — |
| Example 7 | 1 | 5 | 5 | 20 | 25 | 3 | 1.05 | 2.30 | — |
| Reference Example 3 | 0.01 | — | — | — | — | — | — | 2.14 | — |
| Example 8 | 0.01 | 0.5 | 50 | 20 | 25 | 0 | 1.06 | 2.30 | 80 |
| Example 9 | 0.01 | 1.5 | 100 | 25 | 30 | 0 | 1.05 | 2.30 | 50 |

"—" means no measurement.

a total concentration of the carbon and the nitrogen is at least 0.01 at % and at most 10 at %, a concentration of the nitrogen is higher than a concentration of the carbon, and nitrogen atoms are substantially evenly dispersed or solid-dissolved in crystal phases of a starting material.

2. The soft magnetic steel sheet according to claim 1, wherein the $\alpha''$ phase is a crystal phase in which a ratio of a c-axis length to an a-axis length as a lattice constant is different from that of $Fe_{16}N_2$ having a stoichiometric composition.

3. The soft magnetic steel sheet according to claim 1, wherein the concentration of the carbon is 1.2 at % or less, and the concentration of the nitrogen is 9 at % or less.

4. The soft magnetic steel sheet according to claim 1, wherein a saturation magnetic flux density of the soft magnetic steel sheet is over 2.14 T.

5. The soft magnetic steel sheet according to claim 1, wherein a thickness of the soft magnetic steel sheet is at least 0.03 mm and at most 1 mm.

6. A core made of a laminated body of a soft magnetic steel sheet, wherein the soft magnetic steel sheet is the soft magnetic steel sheet according to claim 1.

7. A dynamo-electric machine comprising a core, wherein the core is the core according to claim 6.

* * * * *